(12) United States Patent
Flanagan et al.

(10) Patent No.: US 6,947,800 B2
(45) Date of Patent: Sep. 20, 2005

(54) SMART MACHINE TOOL SYSTEM

(75) Inventors: James D. Flanagan, Milford, MA (US); Brian R. Faucher, Paxton, MA (US)

(73) Assignee: PCC Specialty Products, Inc., Wexford, PA (US)

( * ) Notice: Subject to any disclaimer, the term of this patent is extended or adjusted under 35 U.S.C. 154(b) by 184 days.

(21) Appl. No.: 10/203,956
(22) PCT Filed: Feb. 28, 2001
(86) PCT No.: PCT/US01/06379

§ 371 (c)(1),
(2), (4) Date: Aug. 14, 2002

(87) PCT Pub. No.: WO01/64365

PCT Pub. Date: Sep. 7, 2001

(65) Prior Publication Data

US 2003/0014150 A1  Jan. 16, 2003

Related U.S. Application Data

(60) Provisional application No. 60/186,169, filed on Feb. 29, 2000.

(51) Int. Cl.$^7$ ............................................. G06F 19/00
(52) U.S. Cl. .......................... 700/108; 700/174; 72/20.1
(58) Field of Search .......................... 700/97, 103, 108, 700/107, 17, 177, 169; 29/519, 506; 72/370.24

(56) References Cited

U.S. PATENT DOCUMENTS 5,631,839 A  *  5/1997  Lemoine ...................... 700/108
6,260,427 B1 *  7/2001  Jones et al. ................. 73/865.9
6,546,297 B1 *  4/2003  Gaston et al. ................ 700/83

* cited by examiner

Primary Examiner—Kidest Bahta
(74) Attorney, Agent, or Firm—Alix, Yale & Ristas, LLP

(57) ABSTRACT

A machine tool system (30) includes a tool (32) for cold forming a workpiece over an operating cycle and a sensor device (40) which senses each operating cycle of the tool (32). Identification data for the tool (32) and operating data for the tool (32) are stored on an electronic device (34) fixedly mounted to the tool (32). At least one interface device (46) provides communication between the electronic device (34) and the sensor device (40).

31 Claims, 8 Drawing Sheets

CUT-OFF KNIFE TRANSFERS
BLANK TO DIE CENTER

SMART MACHINE TOOL SYSTEM

CROSS-REFERENCE TO RELATED APPLICATIONS

This is the national stage of International Application No. PCT/US01/06379 filed Feb. 28, 2001. This is a provisional application Ser. No. 60/186,169 filed on Feb. 29, 2000

BACKGROUND OF THE INVENTION

This invention relates generally to methods and apparatus for gundrilling (deep hold drilling) or cold forming workpieces on gundrilling machines, heading machines, or thread rolling machines, including combination machines like bolt making machines.

In thread rolling dies to which the invention relates, workpieces are transformed into finished screws by a rolling process as the workpieces pass between a pair of elongated generally planar dies. One of the dies is stationary, and the other die is displaced relative to the other to produce a surface material flow on the workpiece to thereby form a continuous helical thread path on the screw. In the thread rolling die machines for which the invention has particular applicability, a shorter die of a pair of dies is held in stationary relationship while the longer die is moved in a direction generally parallel to a longitudinal reference plane. The axis of rotation of the body of the workpiece travels longitudinally as the workpiece rolls between the pair of dies. The diameter of the finished thread is controlled by the diameter of the workpiece and the distance between the dies at the finished end of the stroke. The dies are configured so that as the workpiece rolls across the dies, the desired threading is formed on the workpiece. Thread rolling is also accomplished using cylindrical or planetary dies and machines and this invention is applicable to all known configurations.

To be competitive in the marketplace, manufacturers must maintain a cost effective manufacturing environment and must be responsive to customer requests. These two goals can often be in conflict. For example, costs may be reduced by maintaining low inventories of raw materials, finished products, and tooling. However, if such inventories are too low, the manufacturer may be unable to promptly respond to a customer order. Manufacturers typically strike a balance where they maintain some minimum inventory of raw materials and/or finished product such that a hypothetical order may be filled within an acceptable time period. Such manufacturers also monitor their tooling to ensure that new tooling is received just as the old tooling reaches the end of its effective lifetime.

Each set of tools has an effective lifetime which is defined by a maximum number of operating cycles which may be performed before the accumulated wear precludes further use. There are several factors which may change the effective lifetime of a tool set. For example, the rate of tool wear is proportional to the material hardness of the workpieces, where the rate of die wear increases as the material hardness increases. Consequently, the effective lifetime of a die set which is used to form threads on workpieces composed of relatively hard stainless steel is lower than the effective lifetime of an identical die set which is used to form threads on workpieces composed of relatively soft carbon steel.

Effectively monitoring the effective lifetime of tool sets which are utilized to produce many short production runs and/or which are utilized to produce components composed of different materials can be problematic. Although the number of components produced in each run or of each material may be fairly easily determined, conventional record keeping systems for tracking the effective lifetime of the tool set are cumbersome, resulting in errors which can be quite costly to the manufacturer and supplier.

SUMMARY OF THE INVENTION

Briefly stated, the invention in a preferred form is a machine tool system including a tool for cold forming a workpiece over an operating cycle. The tool has an electronic device fixedly mounted thereto which includes means for storing identification data for the tool and operating data for the tool. The system also includes a sensor device which senses each operating cycle of the tool and at least one interface device which provides communication between the electronic device and the sensor device.

Preferably, the electronic device is encased in sealant material within a recess in an exterior surface of the tool. The electronic device may have an antenna extending within the sealant material or an electrical or fiber optic lead extending through the sealant material to the surface of the tool.

The machine tool system interface device generally includes a process monitoring system having a key pad, a monitor, and a microprocessor. The process monitoring system may include a temperature sensor for measuring the temperature of the tool and/or a flow detector for monitoring the flow of coolant to the tool. The interface device also generally includes a portable electronic reader. The portable electronic reader includes a first data transmission interface for sending and receiving signals to the electronic device, memory for storing the signals received from the electronic device, and a second data transmission interface for transmitting the stored signals to the process monitoring system. The portable electronic reader may also includes a display for viewing the signals received from the electronic device.

The machine tool system provides a means for monitoring the life cycle of the tool. Each cold forming tool has a lifetime which can be expressed as the number of operating cycles which can be expected from the tool before such tool no longer operates properly or efficiently. The sensor device senses each operating cycle of the tool and transmits operating cycle data to the electronic device, where such operating cycle data is stored. The identification data and the operating cycle data stored in the electronic device is accessed by the monitoring system or the portable electronic reader and is used to calculate the number of operating cycles that the tool has been used. Subtracting the number of operating cycles that the tool has been used from the expected number of operating cycles over the lifetime of the tool provides a measure of the remaining lifetime of the tool.

It is an object of the invention to provide a machine tool system that automatically monitors the tool usage, facilitating determination of the remaining tool lifetime.

It is also an object of the invention to provide a machine tool system that facilitates identification and inventory of multiple tools.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

With reference to the drawings, wherein like numerals represent like parts throughout the figures, a stationary die 10 and a moveable die 12 are employed to roll a thread on a workpiece to produce a finished screw by a reciprocating flat die method. The reciprocating moveable die 12 moves relative to the stationary die 10 in the direction of the arrows 14 in FIGS. 2 and 4 to define a rolling cycle. As the workpiece rolls longitudinally between the starting and final ends 16, 18 of the stationary die 10, a thread is formed on the workpiece.

Figure 2:
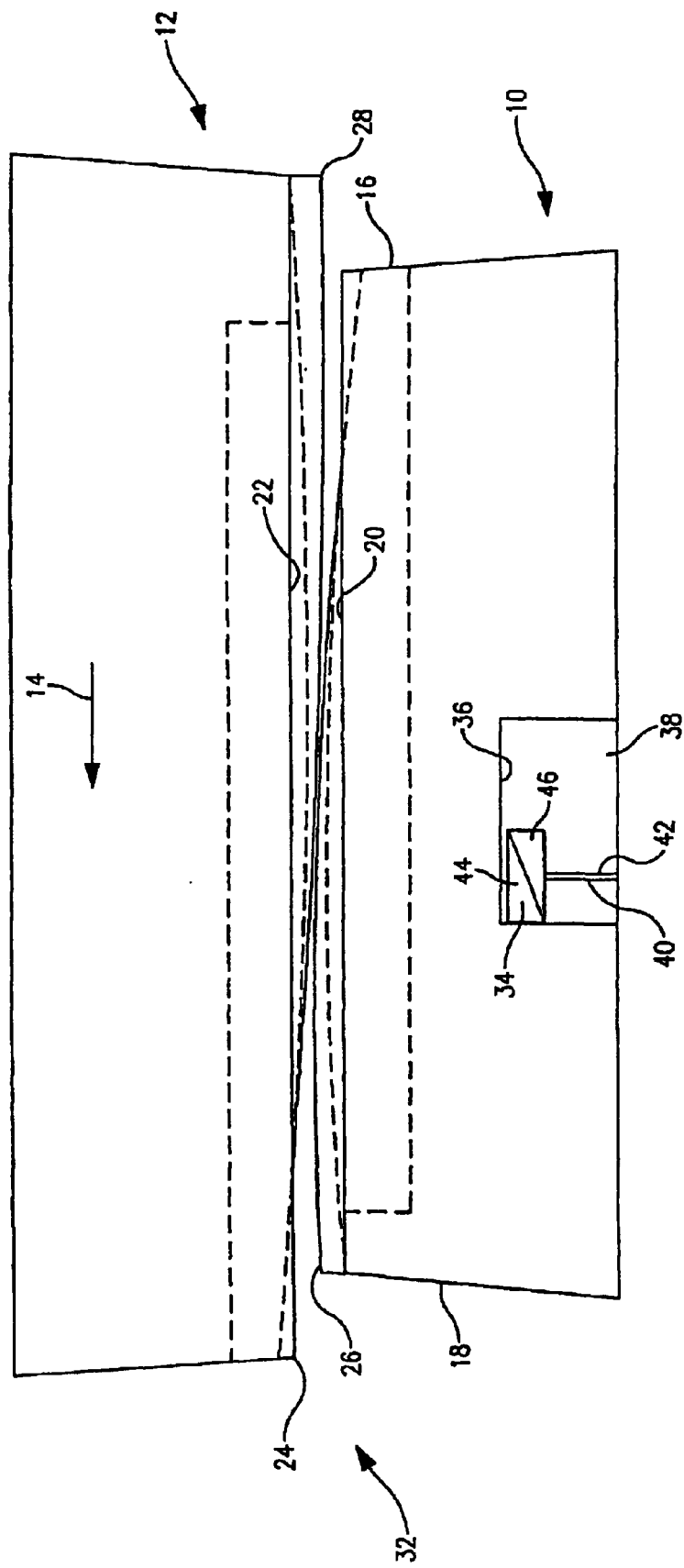
FIG. 2 is a partly schematic top view of the machine tool of FIG. 1 comprising a short stationary die and a long displaceable die in a matched position, the stationary die having a recess containing a microchip.
Figure 4:
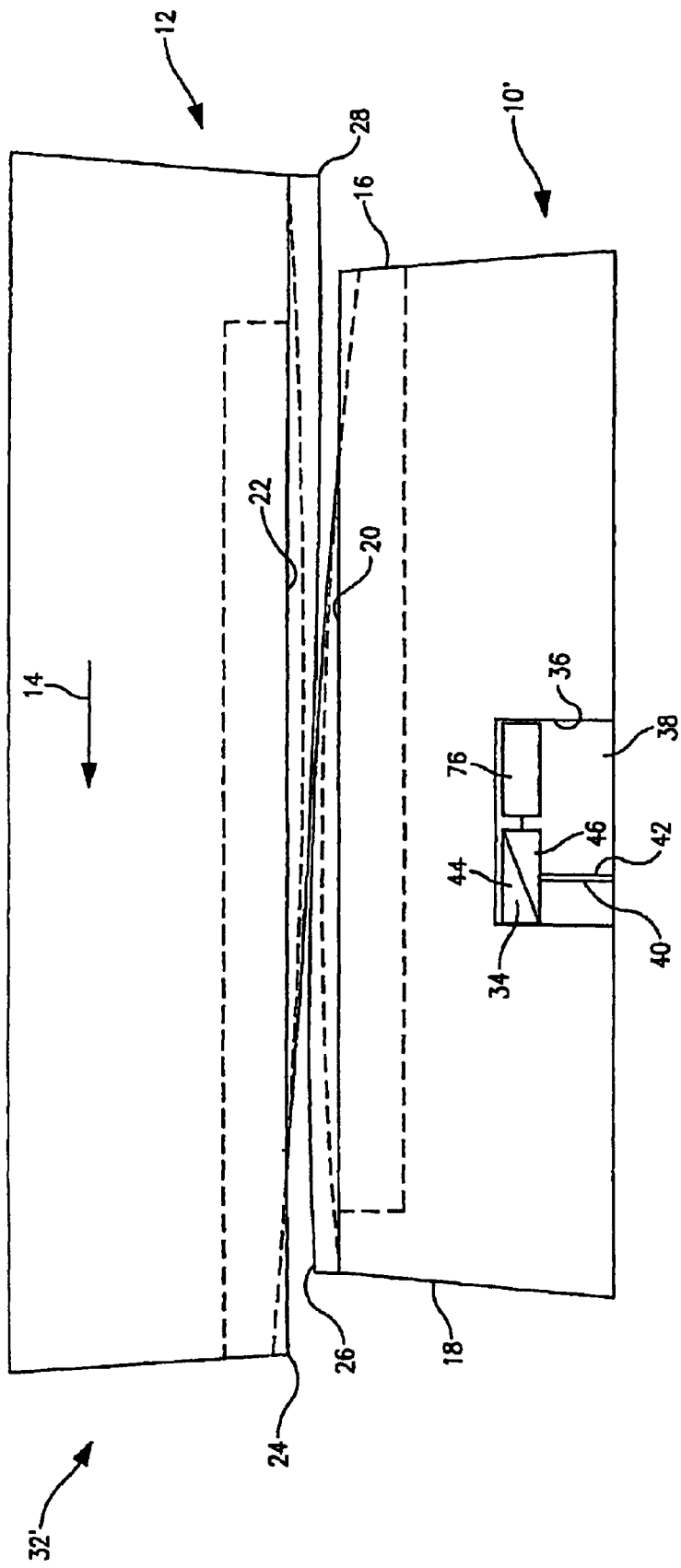
FIG. 4 is a partly schematic top view of the machine tool of FIG. 2 comprising a stationary short die and a displaceable long die in a matched position, the stationary die having a recess containing a sensor and/or a microchip and/or a piezo electric power source.

As illustrated in FIGS. 2 and 4, the dies 10, 12 each have opposing faces 20, 22 configured with ridges and grooves which form the threads and define, for example, the pitch, major diameter, minor diameter and thread type of the finished screw. The dies 10, 12 during each rolling cycle cooperatively gradually penetrate the workpiece to form the finished screw. The dies 10, 12 are configured so that the least amount of rolling work as possible is done in the dwell section to maximize the life of the die.

A starter finger (not illustrated) engages the workpiece blank to ensure that the moving die 12 picks up the blank and starts the rolling process. For most applications, as the workpiece starts at the starting end 16, 24 of each die 10, 12, the threads are deep and sharp. In the dwell sections 26, 28, the threads are flat and shallower. The starting end threads are sharp for easier penetration as the screw starts to roll and get progressively wider along the die length until they ultimately reach width and depth equal to the desired finished thread form. The dies 10, 12 are aligned or "matched" to produce the proper optimum thread continuum. The final die form is termed the dwell section 26, 28 and extends along the die 10, 12 for distance long enough to properly dimension the screw. The thread and tip are fully developed just prior to parting the dies.

For each rolling cycle there is an associated pressure cycle. As described above, the sharpness of the threads and the thread width vary along the length of the dies 10, 12. Consequently, the pressure force which is exerted on the workpiece by the dies 10, 12 varies as the workpiece progresses through the rolling cycle. An ideal pressure cycle may be calculated and compared to the observed pressure cycle of an operating thread rolling system as a means of monitoring its performance. For example, the IMPAX/SK 3000 ™ process monitoring system monitors and displays the rolling pressure force over each rolling cycle of the thread rolling system. The ideal pressure cycle is displayed simultaneously so that the operator is provided with real-time information on deviation from optimum system operating conditions.

The IMPAX/SK 3000 ™ process monitoring system utilizes a piezo-electric sensing device mounted in a die adjusting block to sense the pressure exerted on the workpiece by the dies. Other conventional thread rolling system process monitoring systems may utilize other sensors and locate these sensors in the die block, the frame, or the yoke.

Conventional process monitoring systems may be utilized in several different ways. A persistent deviation between the measured pressure cycle and the ideal pressure cycle generally indicates that the thread rolling system setup is improper. When this occurs, the operator may adjust the thread rolling system setup to minimize or eliminate such deviations and thereby optimize the system performance. A deviation may indicate that a faulty screw was produced during the rolling cycle in which the deviation was observed. When this occurs, the operator may check the output of the thread rolling system to verify the quality of the product.

Figure 1:
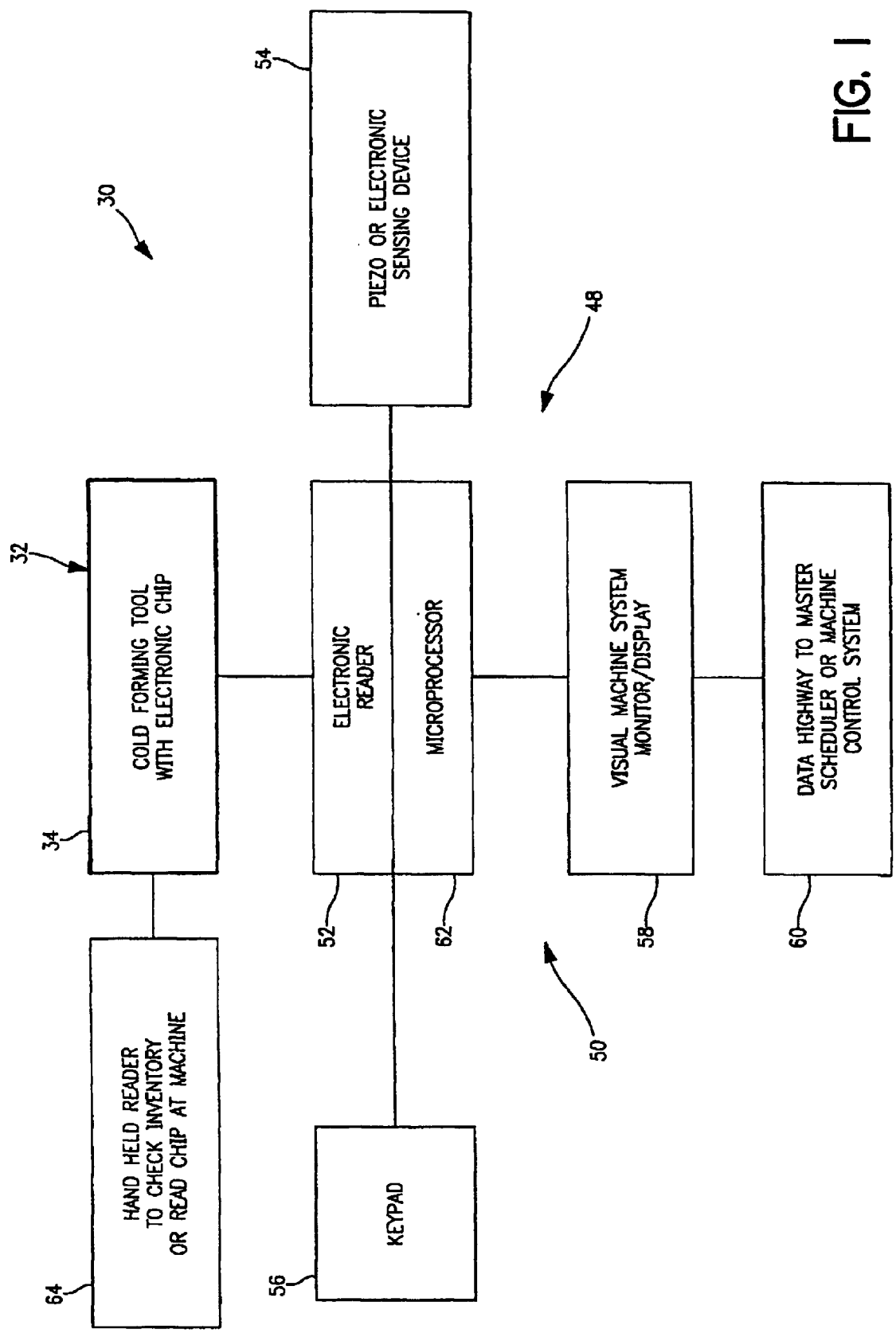
FIG. 1 is a schematic diagram of a first embodiment of a machine tool system in accordance with the invention.

With reference to FIGS. 1 and 2, a first embodiment 30 of a machine tool system in accordance with the invention includes a cold forming tool 32, such as a pair of flat thread rolling dies 10, 12, having an embedded electronic device such as a microchip 34. Preferably, the microchip 34 is positioned in a recess 36 in the stationary die 10 and is mounted within the recess 36 by a sealant material 38, such as potting compound or epoxy, which seals the recess 36 against infiltration by particulate matter and liquids. An antenna 40 extending from the microchip 34 may also be disposed within the sealant material 38. Alternatively, an electrical or fiber optic lead 42 may extend from the microchip 34, through the sealant material 38, to at least the surface of the stationary die 10.

The microchip 34 includes at least a memory portion 44 and a data transmission portion 46. The memory portion 44 has sufficient storage capacity to store tool identification and design data which does not change over the lifetime of the tool and tool operating data which is updated as the tool is used in the manufacturing process. Permanent tool data for a thread rolling die set may include the customer part number, the manufacturer part number, manufacturing information, setup information such as an optimum rolling force curve, and the effective lifetime expressed as a number of rolling cycles. Operating data for a thread rolling die set 10, 12 may include the date/time of each set-up, the date/time of each run, the number of rolling cycles in each run, the number of set-up adjustments in each run, abnormal force incidents, wear pattern documentation by run, and the tool life remaining expressed as a number of rolling cycles. The microchip 34 stores the permanent data and the operating data and communicates this data when queried by an electronic reader. The data transmission portion 46 includes all circuit components and/or software that is required to transmit and receive the operating data. It should be appreciated that any electronic device having at least the memory and data transmission portions 44, 46 described above and which is small enough and rugged enough to be embedded on a cold forming tool 32 may be used in the present invention.

The cold forming machine 48 in which the cold forming tool 32 is mounted includes a process monitoring system 50 having an electronic reader 52, which communicates with the microchip 34 embedded in the cold forming tool 32. Such communication may be by microwave, Rf, infrared, or other common radiation of the electromagnetic spectrum. The process monitoring system 50 also includes sensors 54 for detecting various operating parameters of the cold forming tool 32. The sensors 54 may include a sensor, such as a piezo electric sensor capable of sensing the pressure cycle, for detecting operation of the cold forming tool, a temperature sensor for measuring the temperature of the cold forming tool, or a flow detector for monitoring coolant flow to the cold forming tool. The process monitoring system 50 may also include a key pad 56 for inputting data, a monitor 58 for displaying process information, such as the pressure cycle and a data output 60 to a master scheduler system or a machine control system. The process monitoring system sensors 54 and/or the process monitoring system key pad 56 are utilized to input all the parameters which are recorded in the microchip 34. A microprocessor 62 in the process monitoring system 50 performs any calculations which are necessary to convert the input signals or transform the sensed or inputted data into the form required for storage in the microchip 34. For example, microprocessor 62 calculates the remaining effective lifetime of the cold forming tool 32 based on the output of the sensor 54 which detects operation of the cold forming tool 32 and the expected life data and prior use data stored in microchip 34.

Preferably, the data/query signal received by the data transmission portion 46 of the microchip 34 provides the power required by the microchip 34 to record the data or respond to the query and therefore an external power source is not required. If the data/query signal does not provide sufficient power, an external power source may be used. A battery mounted in the recess 36 may be used as the external power source. Machine generated vibration power may be utilized as well. Alternatively, a data/power connection may be provided between the process monitoring system 50 and microchip via electrical lead 42. If an external power source is utilized, the microchip 34 may be used to perform more power intensive functions. For example, the calculations performed by microprocessor 62 could be performed by microchip 34.

Figure 5:
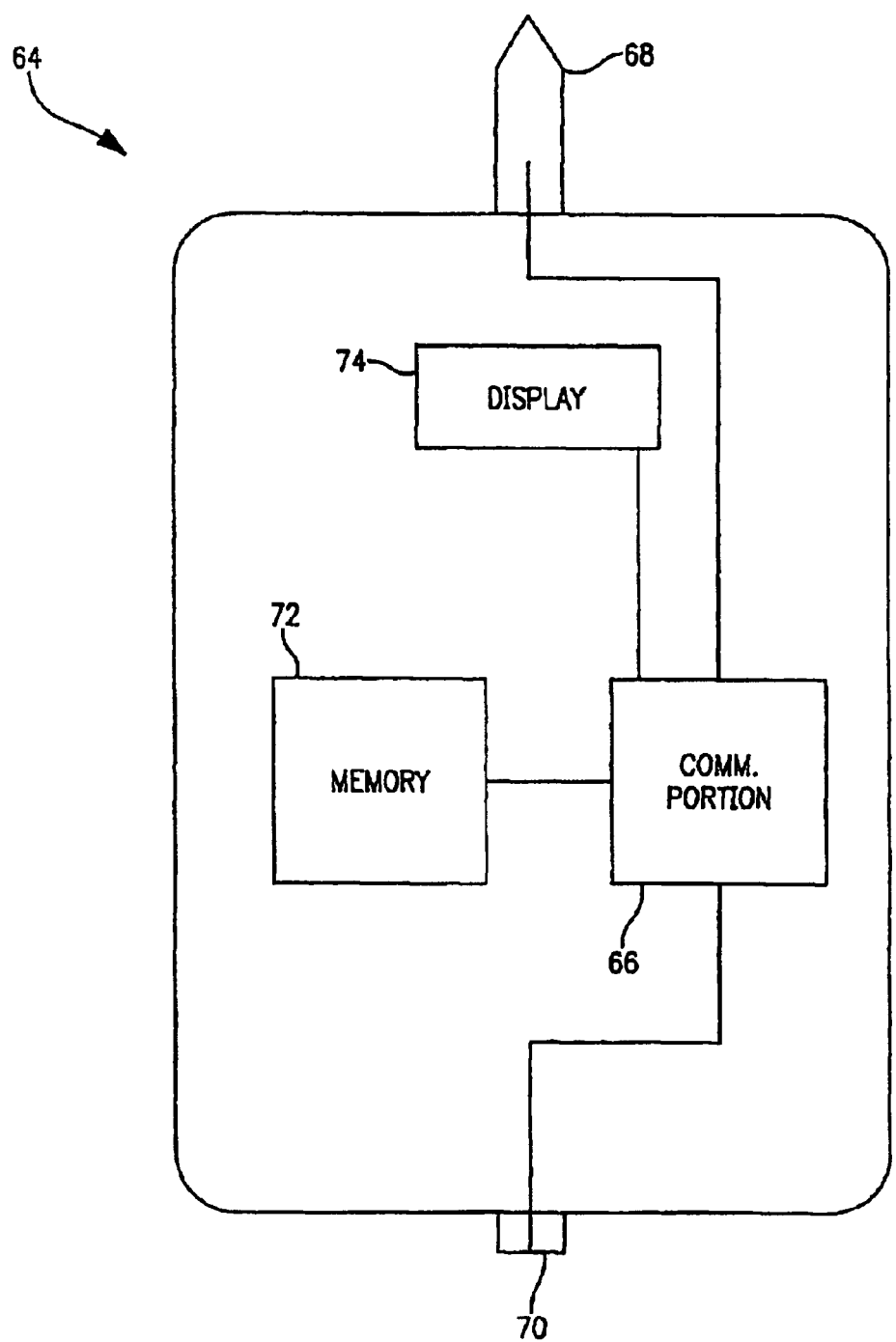
FIG. 5 is a schematic view of the hand-held electronic reader of FIGS. 1 and 3.

With reference to FIG. 5, the machine tool system also includes a portable, hand-held electronic reader 64. The hand-held electronic reader 64 includes a communications portion 66, comprising the circuit components and/or software which are required to send and receive data and query signals, a data transmission interface 68 for sending and receiving signals to microchip 34, and a data transmission interface 70 for transmitting the stored data to the central control system or some other central monitoring system. The hand-held electronic reader 64 also includes memory 72 for storing the data received in response to the query and may include a display 74 for viewing the data received from microchip 34.

The hand-held electronic reader 64 provides flexibility to the subject machine tool system 30, 30'. For example, if the display 58 of the process monitoring system 50 is at a location which is remote from the cold forming tool 32, the hand-held electronic reader 64 allows the operator to query and view the stored data while he is at the cold forming tool 32.

In addition to the cold forming tools 32 which are in use at any moment in time in the cold forming machines 48, most manufacturers also have a tool crib which contains tools 32 which are not actively in use. When the production run of a first type of screw is completed, the first die set 10, 12 (which had been used to produce the first type of screw) is removed from the cold forming machine, a second die set 10, 12 designed for producing the second type of screw is removed from the tool crib and mounted in the cold forming machine 48, and the cold forming machine 48 commences the production run of the second type of screw. If the first die set 10, 12 has not reached the end of its effective lifetime, it is placed in the tool crib for use in the next production run of the first type of screw. If the first die set 10, 12 has reached the end of its effective lifetime, it is discarded, a new first die set 10, 12 is purchased and placed in the tool crib. Therefore, the tool crib generally contains new die sets and used die sets. With good administrative controls, a manufacturer can easily know which cold forming tools 32 are installed in the cold forming machines 48 and which cold forming tools 32 are stored in the tool crib. However, it is more difficult for the manufacturer to know which cold forming tools 32 are new and which are used and much more difficult for the manufacturer to know how many more parts may be produced by any one of the used cold forming tools 32.

The hand-held electronic reader 64 and imbedded microchip 34 provide a means for easily conducting and maintaining an accurate inventory of the manufacturers' cold forming tools 32. More importantly, an inventory conducted with the subject the hand-held electronic reader 64 and imbedded microchip 34 includes easily accessible and up to the minute information on the operating history of each of the cold forming tools 32 and the tool remaining life. To conduct the inventory, the user merely passes the hand-held electronic reader 64 by each cold forming tool 32. During each pass, the reader 64 queries the tool 32, the tool 32 transmits data stored in the microchip 34, and the transmitted data is stored in memory 72. Depending on the capacity of the memory 72, the amount of data which is received from each tool 32, and the number of tools 32 which must be inventoried, the stored data is downloaded to the central computer periodically during the inventory or at the end of the inventory, and the central computer compiles an inventory list. The data query may be customized depending on the needs of a particular inventory. It should be appreciated that the accuracy and ease of use of this method of inventory is dependent on the microchip 34 which is embedded in and inseparable from each cold forming tool 32.

Figure 3:
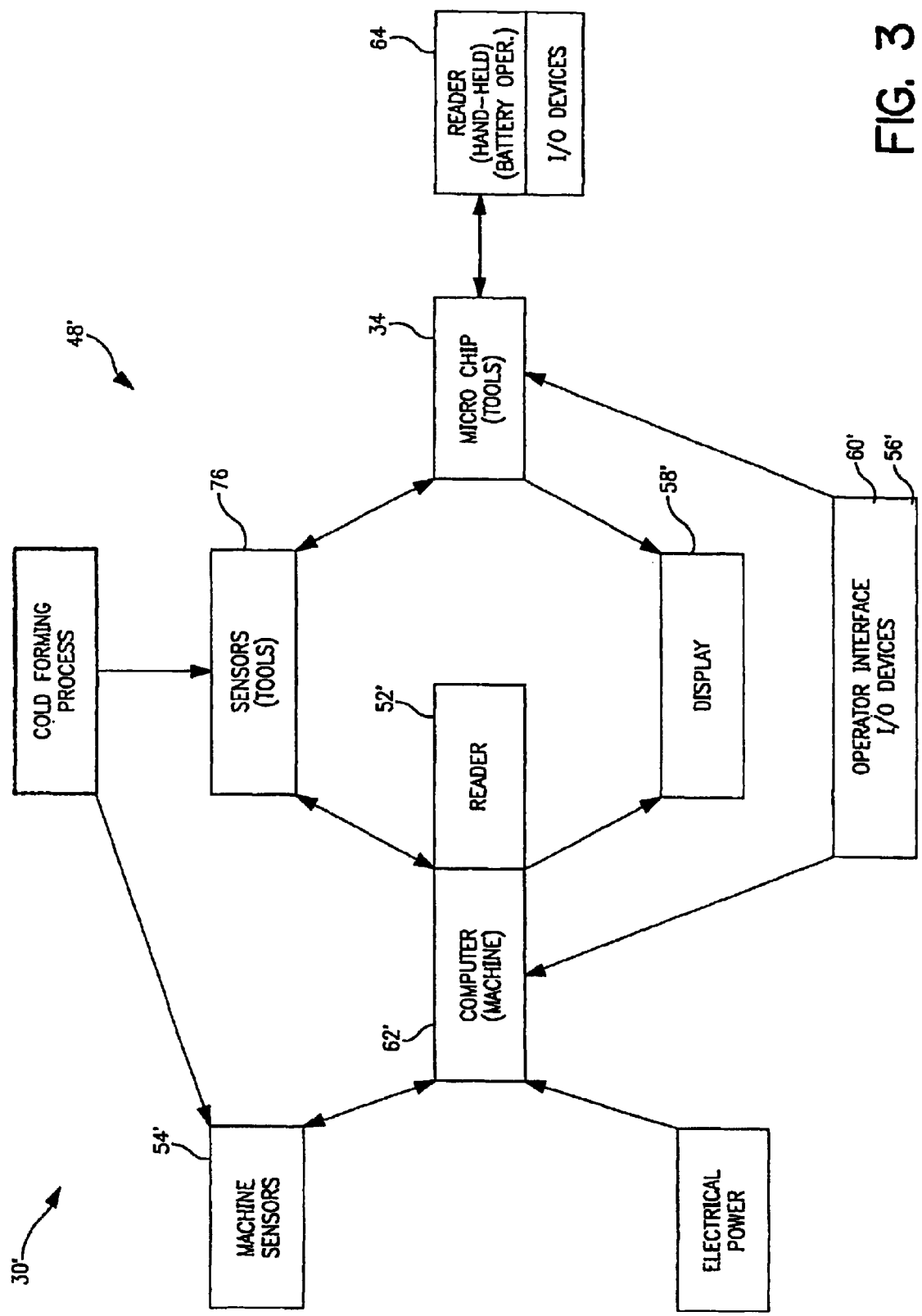
FIG. 3 is a schematic diagram of a second embodiment of a machine tool system in accordance with the invention.

The embodiment 30' illustrated in FIGS. 3 and 4 is very similar to the first embodiment 30 with the primary exception that a sensing device 76, such as a piezo electric device, is mounted in the recess 36 and in communication with the microchip 34. Consequently, the sensing device signal may be received directly by the microchip 34 instead of by way of the microprocessor 62' in the process monitoring system. Preferably, the sensing device signal provides the power required by the microchip 34 to record the data. Alternatively, an external power source such as a battery or an electrical connection with the microprocessor may be used. Similar to the first embodiment, the microchip 34 may perform any required calculations and data conversion if an external power source is utilized. Otherwise, the process monitoring system microprocessor 62' performs the required calculations and data conversion. The process monitoring system includes an electronic reader 52', additional sensors, a key pad 56', a monitor 58', and a data output 60' to a master scheduler system or a machine control system.

Figure 6A:
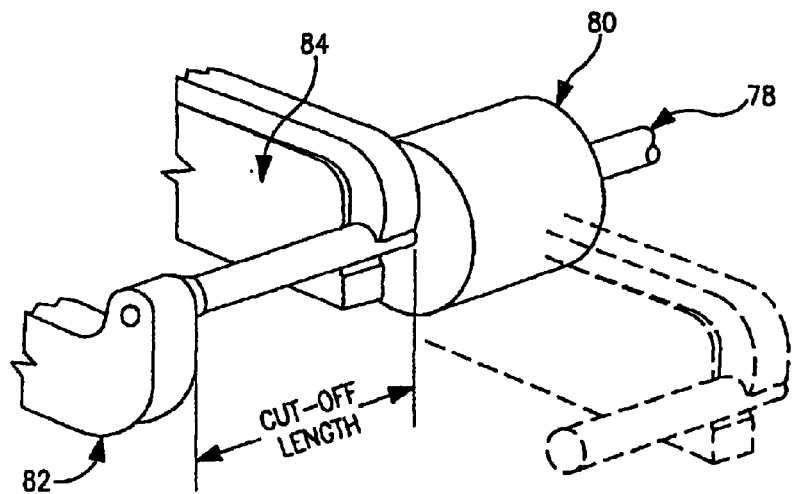
FIGS. 6a through 6d are a schematic representation of a cold heading process utilizing a third embodiment of a machine tool system in accordance with the invention.

FIGS. 6a through 6d show the basic sequence of actions in a standard type solid die, double stroke heading machine. In FIG. 6a, wire 78 is shown being fed through the cut off die 80 until it reaches the wire stop 82. By adjusting the location of this stop 82, the operator determines the length of the blank 86.

Figure 6B:
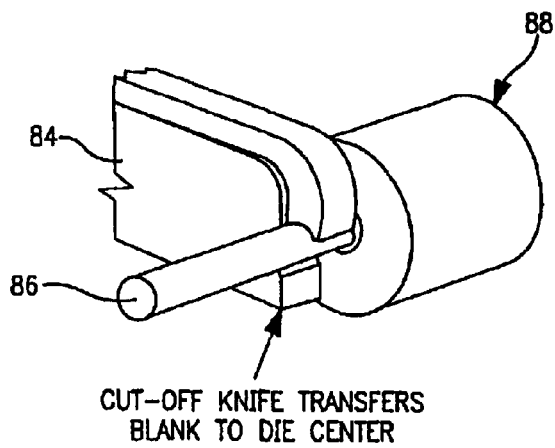

In FIG. 6b, the cutoff knife 84 has already cut the blank 86 from the coil and carried it (the blank) to the heading die 88. The knife stroke is set to stop when the blank 86 is centered on the heading die 88.

Figure 6C:
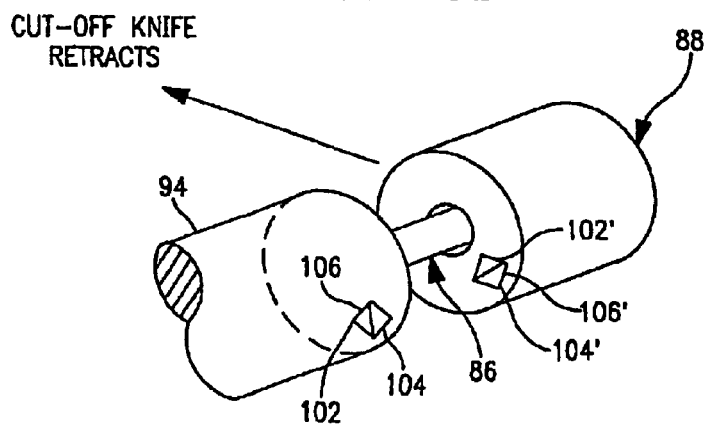

In FIG. 6c, the first punch 90 comes forward for the first blow. The first and second punches 90, 92 are both carried on the ram or gate 94 (both terms are commonly used). As the first punch 90 begins its forward stroke, it pushes the blank 86 into the heading die 88, right up against the knockout pin 96 (if no extrusion is being done). At this point the blank 86 is subjected to the full force of the first punch 90, and begins to flow into its new shape. As the first blow is completed, the extrusion, if any, is done, and the head has been upset into the cone shape, ready for final shaping.

Figure 6D:
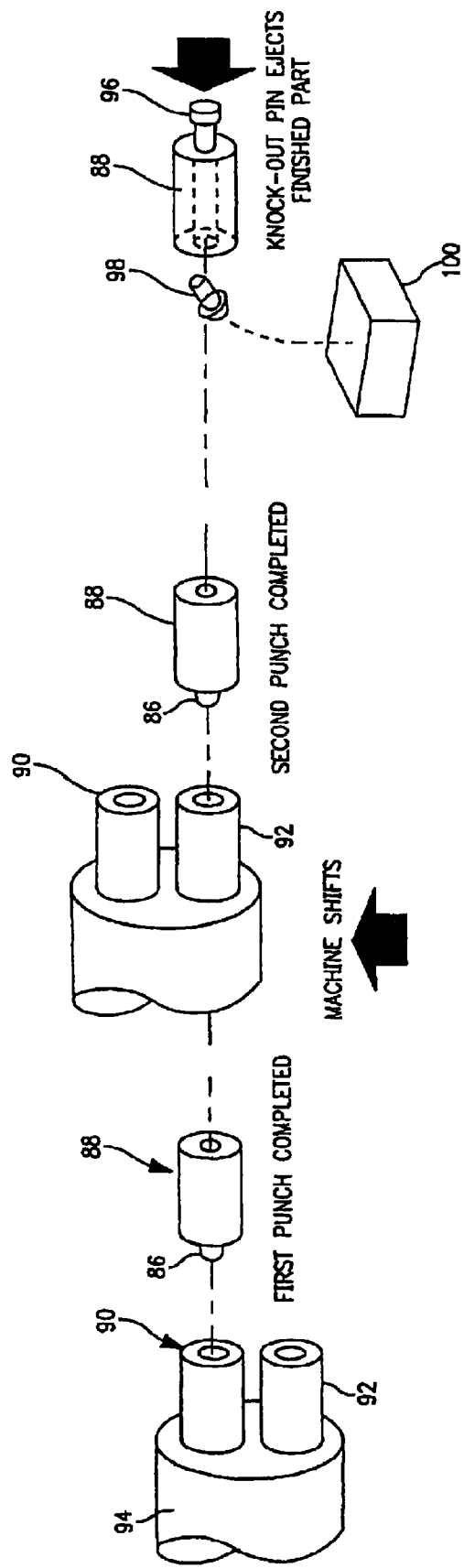

With reference to FIG. 6d, the cam-operated mechanism shifts the punches 90, 92 after the first blow, so that the second punch 92 is aligned with the heading die 88. The gate 94 comes forward again, the second or finish blow, is struck, and the gate 94 withdraws. As it withdraws, the punches 90, 92 are now shifted so that the first, or cone punch 90, is again in position for the new blank. Meanwhile, as the gate 94 is withdrawing, the knockout pin 96 comes forward all the way to the face of the die 88, forcing the finished part 98 out ahead of it. As the gate 94 reaches its fully withdrawn position, the finished part 98 is ejected and falls into a collection bin 100. The cutoff knife 84 is already starting to move a new blank into position, ready to begin the cycle all over again.

As shown in FIGS. 6c and 6d, a sensor 102, 102' and a microchip 104, 104' are mounted in a recess in each of the gate 94 and heading die 88. The sensors 102, 102' detect each operation of the cold heading tool and transmit a signal to a process monitoring system for use by the system and for storage in the microchip 104, 104'.

Figure 7:
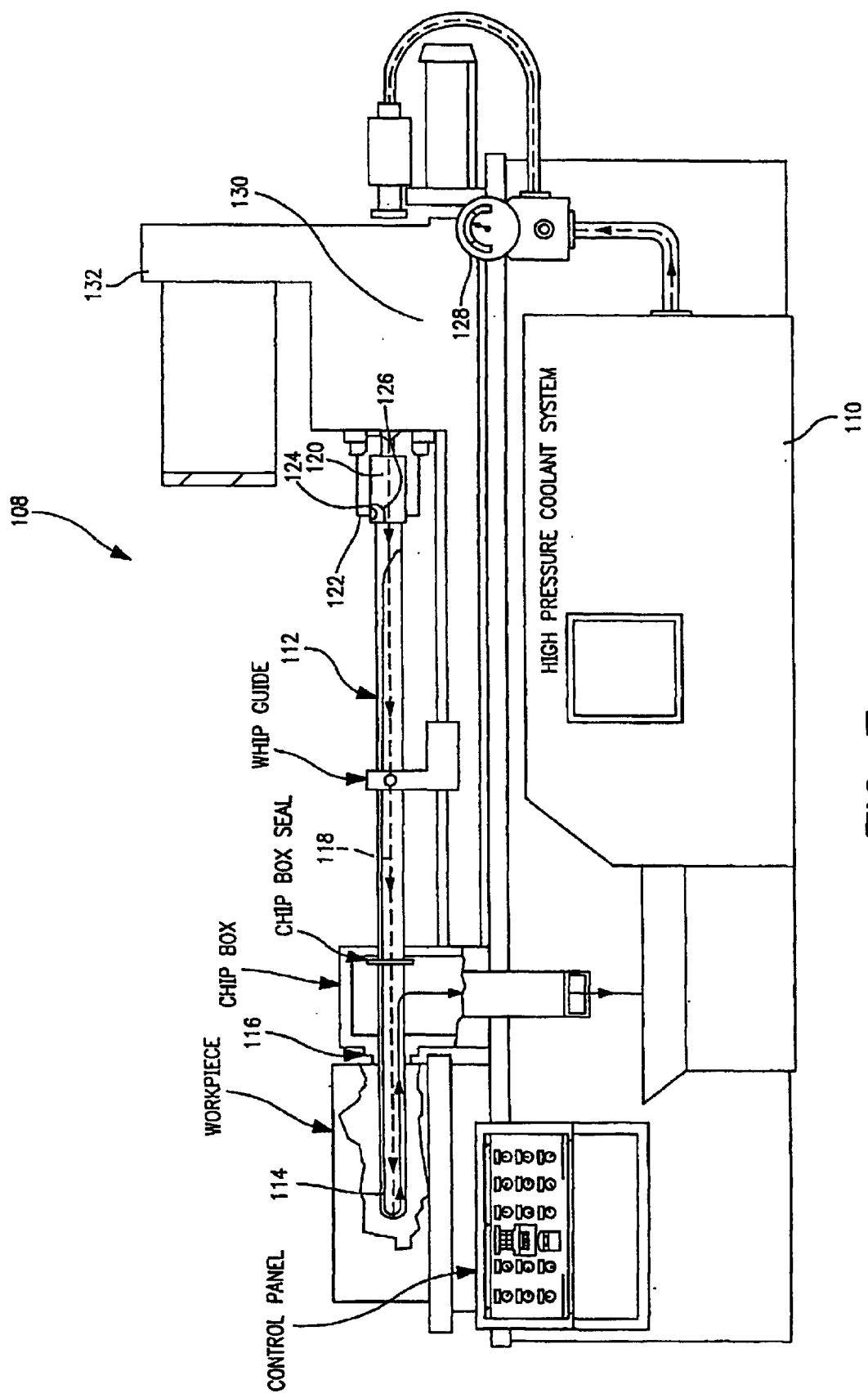
FIG. 7 is a perspective view, partly in section, of a gun drilling machine utilizing a fourth embodiment of a machine tool system in accordance with the invention.

With reference to FIG. 7, gundrilling is a metal removal process utilizing a drilling machine 108, a high pressure coolant system 110, and a single or a two flute gundrill 112. The gundrilling process is a controlled operation which offers size, location, finish, and straightness accuracy where critical tolerances are important. Added benefits are scrap reduction, burr-free holes, bottom forming, and blind holes, as well as entry with surfaces other than 90 degrees. Repeatability makes this application feasible on numerically controlled equipment.

In addition to dedicated gundrilling machines 108, gundrills 112 and coolant systems 110 are easily integrated with CNC machining centers, lathes, and milling machines, providing users with all the benefits of the process for a relatively small investment. Incorporating gundrills 112 on other types of machinery often requires a short (1 to 2 diameters deep) starter hole to be used in place of the gundrilling machine's starter bushing 116. The gundrill tip 114 is then fed Into the predrilled hole before engaging the spindle.

The gundrill 112 is a simple, basic tool with three essential parts: the tip 114, the shank 118, and the driver 120. These parts are brazed together into one correctly aligned unit.

The tip 114 is the most critical of the three elements. The tip 114 cuts the hole and maintains precision as it pilots the drill through the part, producing precision holes in one pass. The point or nosegrind has two basic angles that may be varied for optimum results depending on the material to be drilled. These angles must balance the cutting forces, distributing them to the tip's bearing pads to keep the drill concentric. The tip 114 is slightly larger in diameter than the shank, thus enabling the shank 118 to rotate freely without contacting the hole wall. Through the tip 114 is an oil hole which lines up with the shank's oil channel to facilitate correct flow of coolant at high pressures to the cutting edge.

As shown in FIG. 7, a sensor 122 and a microchip 124 are mounted in a recess 126 in the gundrill 112. The sensor 122 detects each operation of the gundrill 112 and transmits a signal to a process monitoring system for use by the system and for storage in the microchip 124.

It should be appreciated that the heading, threading, and gundrilling machine tools described above may include sensors, other than the load sensors, for monitoring additional system parameters. For example, sensors 128, 130, 132 may also be located in other components of the gundrilling system, as shown in FIG. 7. Sensors 128 in the coolant system 110 may be provided to sense coolant flow and/or temperature.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A machine tool system comprising:
    a tool for cold forming a workpiece over an operating cycle, the tool having an electronic device fixedly mounted thereto, the electronic device having means for storing data including identification data for the tool and operating data for the tool;
    a sensor device which senses each operating cycle of the tool; and
    at least one interface device in communication with the electronic device and the sensor device.

2. The machine tool system of claim 1 further comprising a sealant material, the tool having an exterior surface and defining a recess extending from the surface, the electronic device being disposed within the recess and encased by the sealant material, the electronic device having an antenna extending within the sealant material.

3. The machine tool system of claim 1 further comprising a sealant material, the tool having an exterior surface and defining a recess extending from the surface, the electronic device being disposed within the recess and encased by the sealant material, the electronic device having a fiber optic lead extending through the sealant material to at least the surface of the tool.

4. The machine tool system of claim 1 wherein the at least one interface device includes a process monitoring system having a key pad, a monitor, and a microprocessor.

5. The machine tool system of claim 4 wherein the process monitoring system also includes a temperature sensor for measuring the temperature of the tool.

6. The machine tool systen of claim 4 wherein the tool also has a cooling system carrying a flow of coolant through the tool and the process monitoring system also includes a flow detector for monitoring the flow of coolant.

7. The machine tool system of claim 4 wherein the at least one interface device also includes a portable electronic reader.

8. The machine tool system of claim 7 wherein the portable electronic reader includes a first data transmission interface for sending and receiving signals to the electronic device, memory for storing the signals received from the electronic device, and a second data transmission interface for transmitting the stored signals to the process monitoring system.

9. The machine tool system of claim 8 wherein the portable electronic reader also includes a display for viewing the signals received from the electronic device.

10. The machine tool system of claim 1 wherein the electronic device and the interface device each have a communication portion, the communication portion of the interface device including means for transmitting a data/query signal, the communication portion of the electronic device having means for receiving the data/query signal and powering the means for storing data with the data/query signal.

11. The machine tool system of claim 1 further comprising a power source mounted to the tool.

12. The machine tool system of claim 1 wherein the tool includes a punch, a die, and a ram, the sensor device comprises first and second sensors, and the electronic device comprises a first microchip, the die and ram each defining a recess, the first sensor and the first microchip being mounted within the recess of the die, the second sensor being mounted within the recess of the ram.

13. The machine tool system of claim 12 wherein the electronic device also comprises a second microchip mounted within the recess of the ram.

14. The machine tool system of claim 1 wherein the tool is a gundrill defining a recess, the sensor being mounted within the recess of the gundrill.

15. The machine tool system of claim 14 wherein the electronic device is mounted within the recess of the gundrill.

16. The machine toot system of claim 1 wherein the identification data for th.e tool is selected from customer part number, manufacturer part number, manufacturing information, set-up information, effective lifetime, and any combination thereof.

17. The machine tool system of claim 16 wherein the set-up information comprises an optimum rolling force curve.

18. The machine tool system of claim 16 wherein the effective lifetime is a predetermined number of rolling cycles.

19. The machine tool system of claim 1 wherein the operating data for the tool is selected from date/time of each set-up, date/time of each run, number of rolling cycles experienced in each run, number of set-up adjustments experienced in each run, abnormal force incidents, wear pattern by run, tool life remaining, and any combination thereof.

20. The machine tool system of claim 19 wherein the tool life remaining is computed by subtracting the number of rolling cycles experienced by the tool from a predetermined number of rolling cycles.

21. The machine tool system of claim 10 wherein there are no other sources of power connected to the electronic device.

22. The machine tool system of claim 11 wherein the power source is a battery.

23. The machine tool system of claim 11 wherein the sensor device is a piezo electric device, said piezo electric device emitting a signal indicative of the operating cycle of the tool, said signal powering the means for storing data, whereby said piezo electric device is the power source.

24. A method of monitoring the life cycle of a cold forming tool in a cold forming system, the tool having an electronic device fixedly mounted thereto, the method comprising the steps of:

storing identification data for the tool in the electronic device;

sensing each operating cycle of the tool with an operating cycle sensor device and transmitting operating cycle data from the operating signal sensor device; and receiving and storing the operating cycle data in the electronic device.

25. The method of claim 24 wherein the cold forming system also has a process monitoring system, the method further comprising the steps of:

receiving the operating cycle data in the process monitoring system; and transmitting the operating cycle data from the process monitoring system to the electronic device.

26. The method of claim 25 wherein the cold forming system further has a temperature sensor, the method further comprising the steps of:

sensing the temperature of the tool; and transmitting a signal corresponding to the sensed temperature of the tool to the process monitoring system.

27. The method of claim 25 further comprising the steps of:

accessing the identificadon data and the operating cycle data stored in the, electronic device with the process monitoring system; and displaying the identification data and the operating cycle data at the process monitoring system.

28. The method of claim 24 further comprising the step of accessing the identification data and the operating cycle data stored in the electronic device with a portable reader.

29. The method of claim 28 further comprising the step of recording the identification data and operating cycle data in the portable reader.

30. The method of claim 28 further comprising the step of displaying the identification data and operating cycle data at the portable reader.

31. The method of claim 24 further comprising the steps of:

determining the expected number of operating cycles over the lifetime of the tool;

accessing the identification data and the operating cycle data stored in the electronic device;

calculating the number of operating cycles that the tool has been used from the operating cycle data; and subtracting the number of operating cycles that the tool has been used from the expected number of operating cycles over the lifetime of the tool to determine the remaining lifetime of the tool.

* * * * *

UNITED STATES PATENT AND TRADEMARK OFFICE
CERTIFICATE OF CORRECTION

PATENT NO. : 6,947,800 B2
APPLICATION NO. : 10/203956
DATED : September 20, 2005
INVENTOR(S) : Flanagan et al.

Page 1 of 1

It is certified that error appears in the above-identified patent and that said Letters Patent is hereby corrected as shown below:

<u>Column 9</u>:
Line 30, delete "toot" and insert --tool--.

Line 31, delete "th.e" and insert --the--.

<u>Column 10</u>:
Line 31, delete "identificadon" and insert --identification--.

Line 31, before "electronic" delete ",".

Signed and Sealed this

Twelfth Day of September, 2006

JON W. DUDAS
*Director of the United States Patent and Trademark Office*